United States Patent [19]
Balajadia

[11] Patent Number: 5,913,741
[45] Date of Patent: Jun. 22, 1999

[54] BICYCLE WITH THREE BOTTOM BRACKET SHELLS AND GEARING SYSTEM

[76] Inventor: Jose P. Balajadia, 61-15 98 St. Apt. 3J, Rego Park, N.Y. 11374

[21] Appl. No.: 08/931,109

[22] Filed: Sep. 15, 1997

[51] Int. Cl.[6] ........................................................ F16H 7/00
[52] U.S. Cl. .................................................................. 474/88
[58] Field of Search ............................... 474/88; 280/261

[56] References Cited

U.S. PATENT DOCUMENTS

| | | | |
|---|---|---|---|
| 484,857 | 10/1892 | Kempe | 280/261 |
| 559,299 | 4/1896 | Matthern | 280/261 |
| 641,980 | 1/1900 | Lower | 474/88 X |
| 1,154,292 | 9/1915 | Cribbs | 280/261 |
| 1,289,597 | 12/1918 | Andreotta | 474/88 |
| 1,360,032 | 11/1920 | Schiffner | 474/88 X |
| 1,535,714 | 4/1925 | Burke | 280/261 |
| 1,630,442 | 5/1927 | Makris | 474/88 X |
| 2,633,030 | 3/1953 | Colden | 474/88 |
| 3,921,467 | 11/1975 | Matsuura | 474/88 |
| 4,826,191 | 5/1989 | Matre et al. | 474/88 X |
| 5,102,155 | 4/1992 | Chou | 280/261 X |

OTHER PUBLICATIONS

Glenn's New Complete Bicycle Manual, 1987 by Crown Publishers, Inc. p. 136.
Bicycle Maintenance And Repair, 1986 by Rodale Press, Inc. pp. 14–84.
The Bicycle Repair Book 1985 by Rob Van der Plas, pp. 41 & 42.

Primary Examiner—Thomas R. Hannon

[57] ABSTRACT

A "Unique" bicycle is basically a bicycle having three bottom bracket shells namely, a first bottom bracket shell (70) for the crankset (57), located at the down tube (40), a second bottom bracket shell (72) for the first converter (FIG. 6) located at the bottom end of the seat tube (42), and a third bottom bracket shell (74) for the second converter (FIG. 7), located at about the middle of the seat tube (42).

Three separate chains are used to interconnect all the gears. The first chain (62) connects the chainwheel (58) to the first converter's small gear (22) and its large gear (24) is connected to the second converter's small gear (22) by means of the second chain (62), while the large gear (24) is connected to the rear wheel gear (64) by means of the third chain (62).

The "Unique" bicycle has a slightly longer top tube (36) and its down tube (40) is also longer but is bent horizontally at the lower portion in order to position the crankset (57) farther away from the saddle (48) so as to provide a comfortable, erect, sitting position for the rider similar to that of a motorcycle.

The converters make it possible to easily pick up speed and less tiring to maintain top speeds for prolonged periods of time.

1 Claim, 9 Drawing Sheets

PRIOR ART — BOTTOM BRACKET

FIG. 1

PRIOR ART BICYCLE FRAME
FIG. 2

PRIOR ART - DICTA DEVICE
FIG. 4

BICYCLE WITH THREE BOTTOM BRACKET SHELLS AND GEARING SYSTEM

BACKGROUND—CROSS REFERENCE TO RELATED APPLICATION

This invention uses the modified Dicta device of my co-pending application, Ser. No. 08/889980, Filed Jul. 10, 1997.

BACKGROUND—FIELD OF INVENTION

This invention relates to bicycles specifically to one which has three bottom brackets namely, one at the down tube where the crankset is attached and two at the seat tube where devices for converting, magnifying, and increasing the chainwheel's rotational output imparted to the rear wheel gear are attached.

BACKGROUND—DISCUSSION OF PRIOR ART

Originally bicycles were made with fixed transmission ratio. This limited their efficiency making it difficult to pick up speed and too tiring to maintain top speeds for prolonged periods of time. Also, the bottom bracket is too close to the saddle making it uncomfortable for the rider to operate the bicycle. The rider has to bend and support the upper body weight with both hands on the handlebars.

No patentability search was done on this invention because the improvements are so radical that it would be very difficult to find a prior art like it.

However, I find the bicycle as a relevant prior art. I find the bottom bracket as a relevant prior art. I find the Dicta device as a relevant prior art.

I need not describe what a bicycle and a bottom bracket are for we are all familiar with them. I will describe the Dicta device however because it is relatively new and not well known.

The Dicta device is used to convert, magnify, and increase the chainwheel's rotational output that is imparted to the rear wheel gear of a bicycle. It is interposed between the chainwheel and the rear wheel gear for this reason.

The Dicta device has a freewheel body with a threaded hole at the center. It has a rotating drum having a small gear and a large gear integral to it, rotating together around the periphery of the freewheel body.

Two separate chains are used to interconnect all gears. One chain connects the chainwheel to the small gear of the Dicta device and another chain connects the large gear of the Dicta device to the rear wheel gear of the bicycle.

OBJECTS AND ADVANTAGES

Accordingly, several objects and advantages of my invention are, 1. faster pick up of speed, 2. less tiring to maintain top speeds for prolonged periods of time, and 3. provides a more comfortable riding position for the operator or rider.

Other objects and advantages of my invention are, 1. less pedal pushing is required and 2. less time needed to reach a destination.

Further objects and advantages of my invention will become apparent from a consideration of the drawings and ensuing description.

LIST OF REFERENCE NUMERALS

10—lockring
12—adjustable cup
14—bearings
16—spindle (axle)
18—fixed cup
20—gear fixing bolt
22—small gear attached to bottom bracket
24—large gear attached to bottom bracket
26—threaded hole of Dicta device
29—freewheel body of Dicta device
30—rotating drum of Dicta device
32—small gear for Dicta device
34—large gear for Dicta device
36—top tube
38—head tube
40—down tube
42—seat tube
44—seatstay
46—chainstay
48—saddle
50—handlebar
52—fork
54—fork tips
56—dropouts
57—crankset
58—chainwheel
60—pedal
62—chain
64—rear wheel gear
66—rear wheel
68—front wheel
70—first bottom bracket shell for crankset
72—second bottom bracket shell for first converter
74—third bottom bracket shell for second converter

SUMMARY

The "Unique" bicycle is basically a bicycle having three bottom bracket shells in its frame. The first one at the down tube is for the crankset, the second one at the bottom end of the seat tube is for the first converter, and the one at the seat tube above is for the second converter. Converters convert, magnify and increase the chainwheel's rotational output that is imparted to the rear wheel gear of the "Unique" bicycle. The "Unique" bicycle provides a comfortable, erect, sitting position for the rider.

DESCRIPTION OF INVENTION

The "Unique" bicycle has basically identical parts as an ordinary bicycle except for those due to improvements made. In order to easily describe the "Unique" bicycle, it would be practical to just cite their differences.

Figure 1:
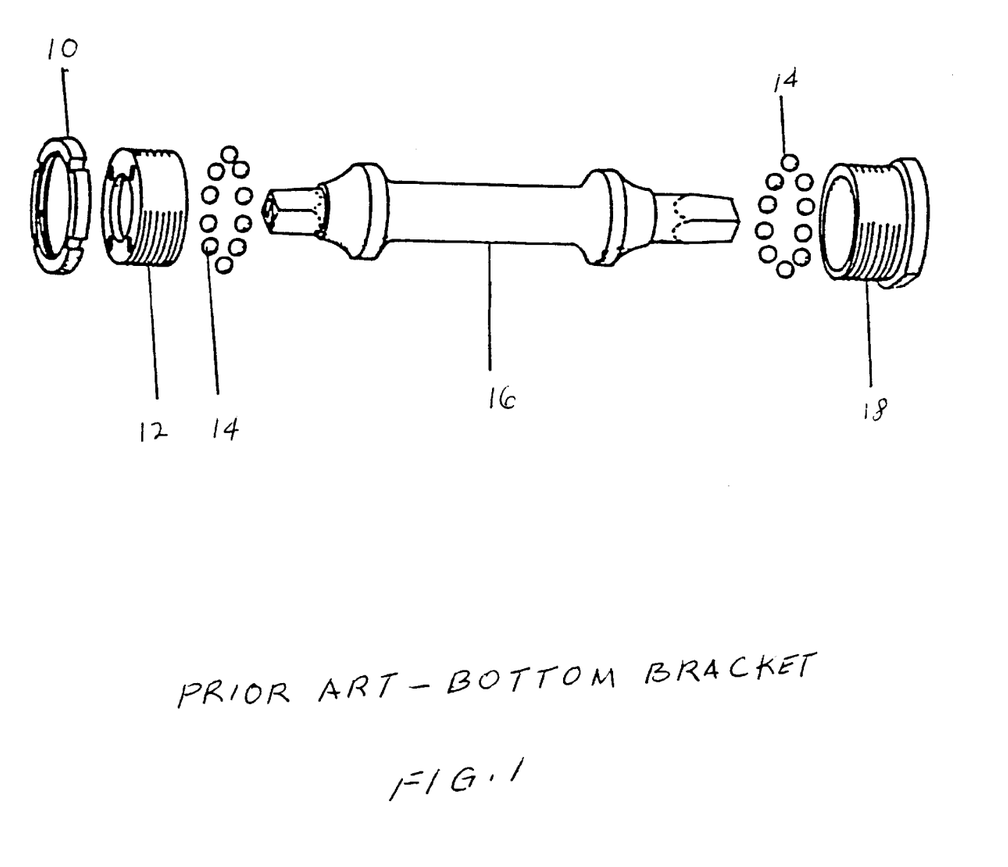
FIG. 1 is a perspective of a bottom bracket, a prior art.
Figure 2:
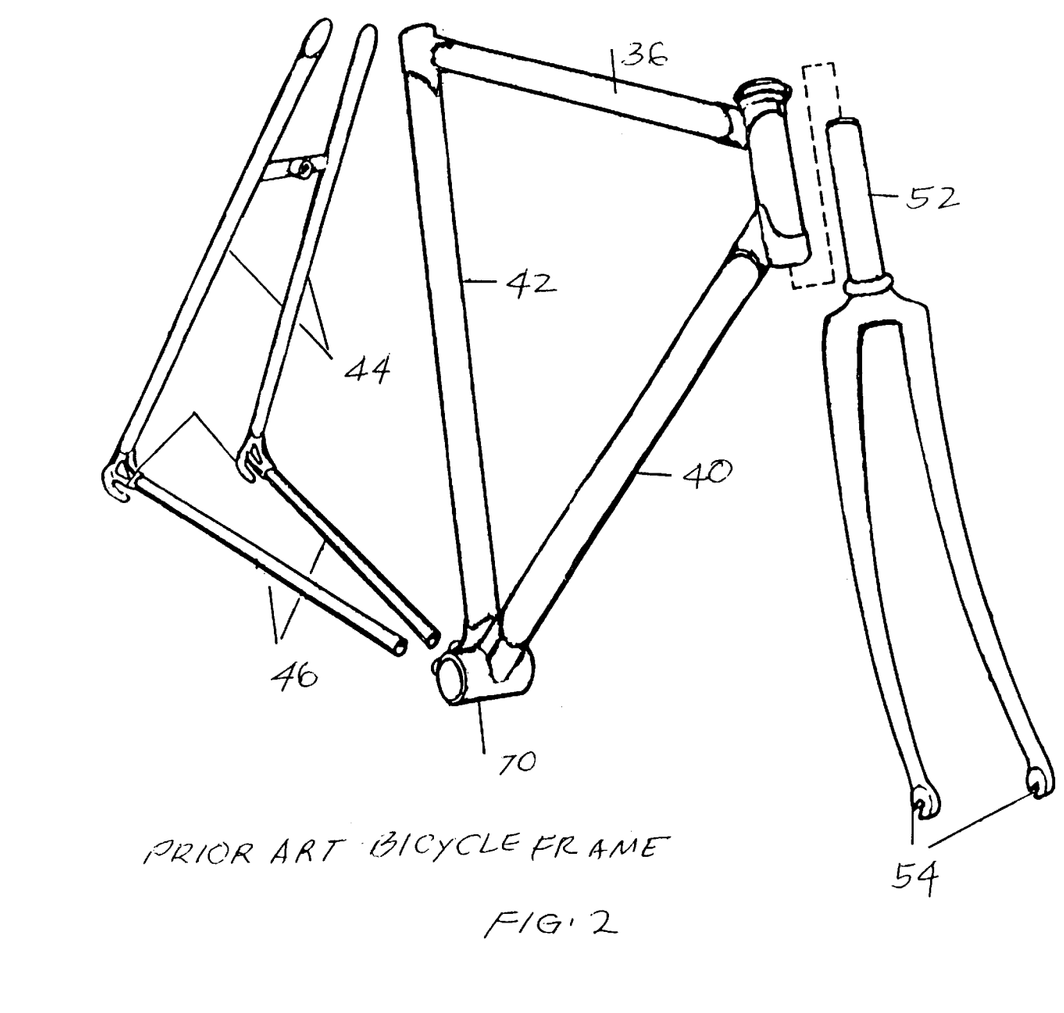
FIG. 2 is a perspective of a bicycle frame, a prior art.
Figure 3:
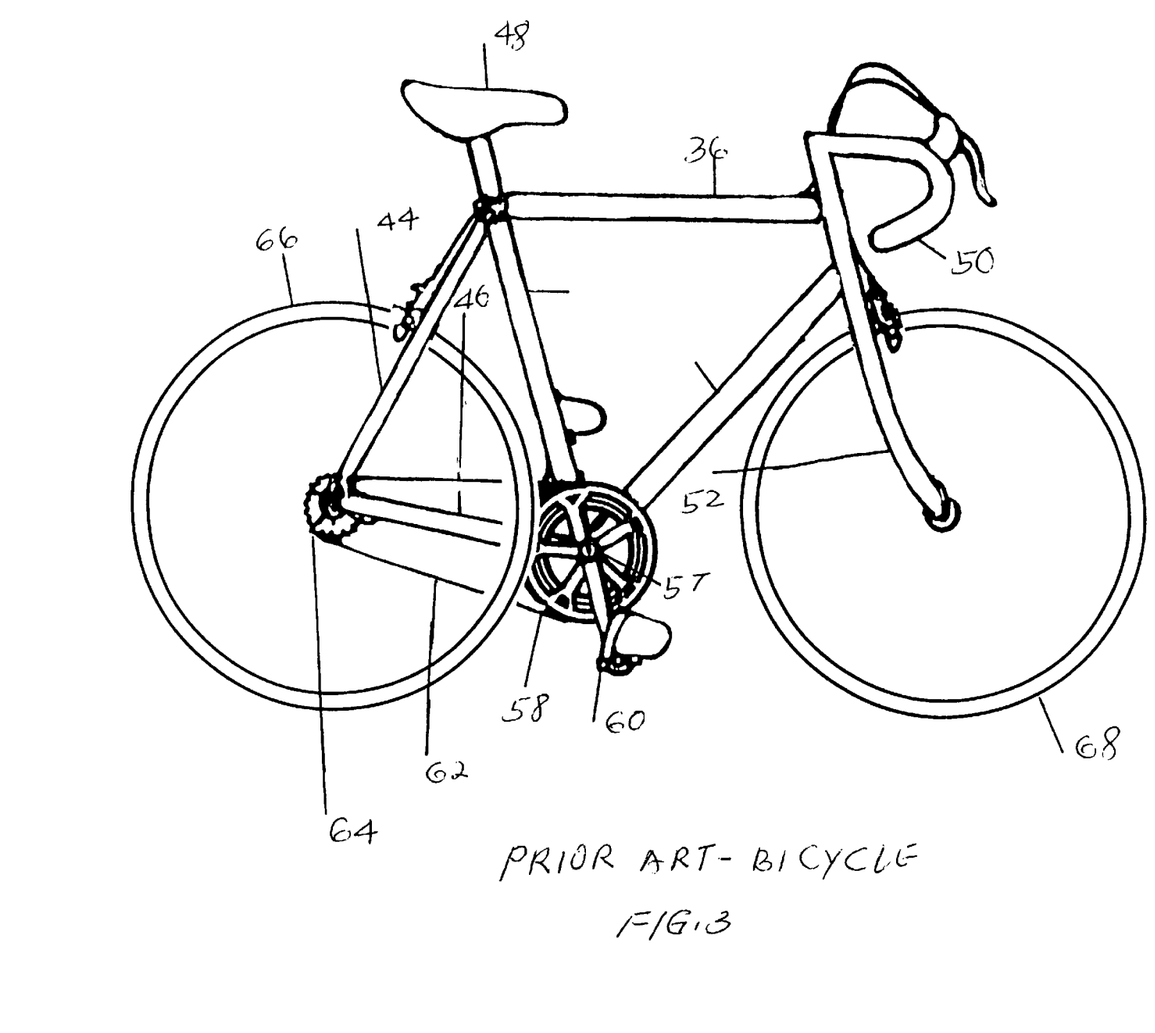
FIG. 3 is a side elevation of a bicycle, a prior art.
Figure 4:
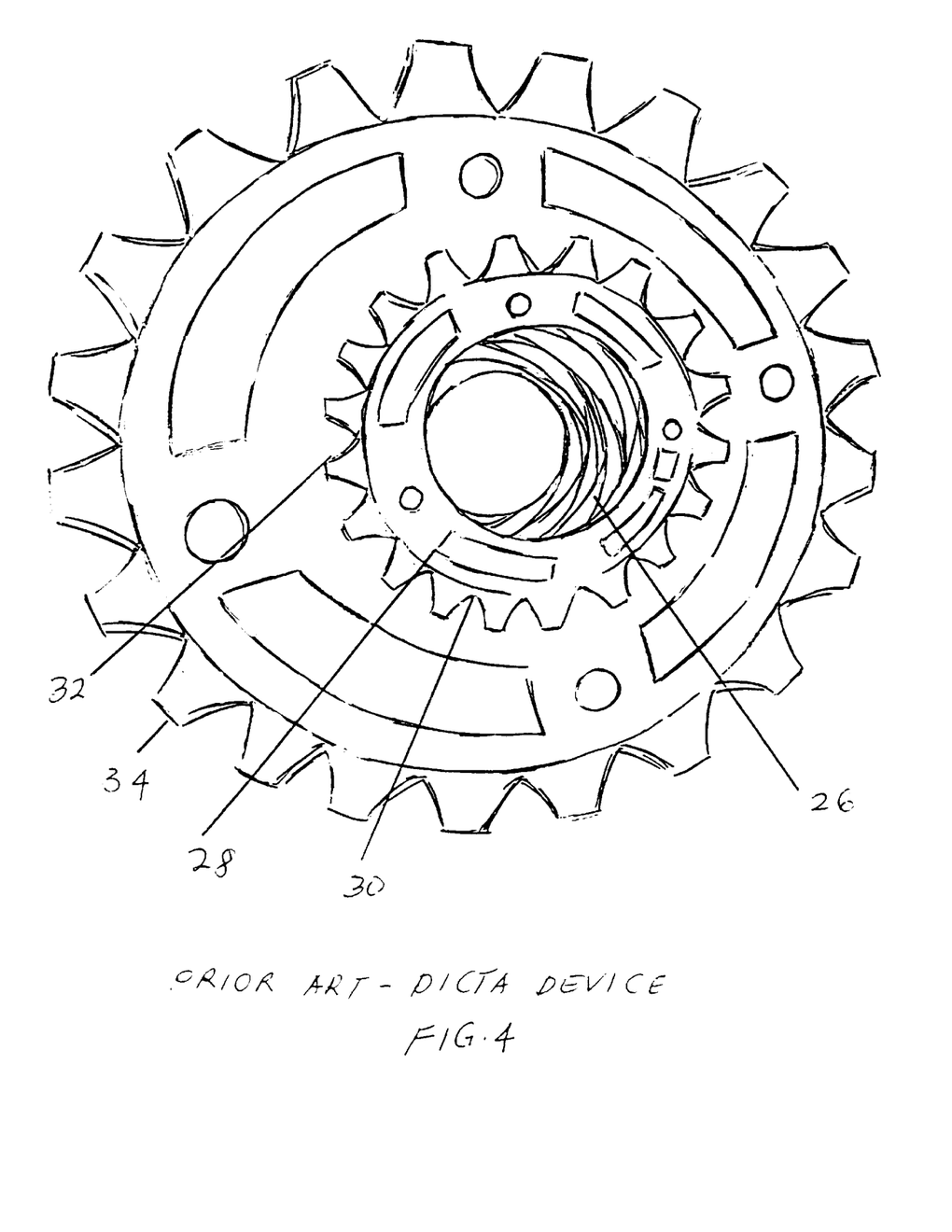
FIG. 4 is a perspective of a Dicta device, a prior art.
Figure 5:
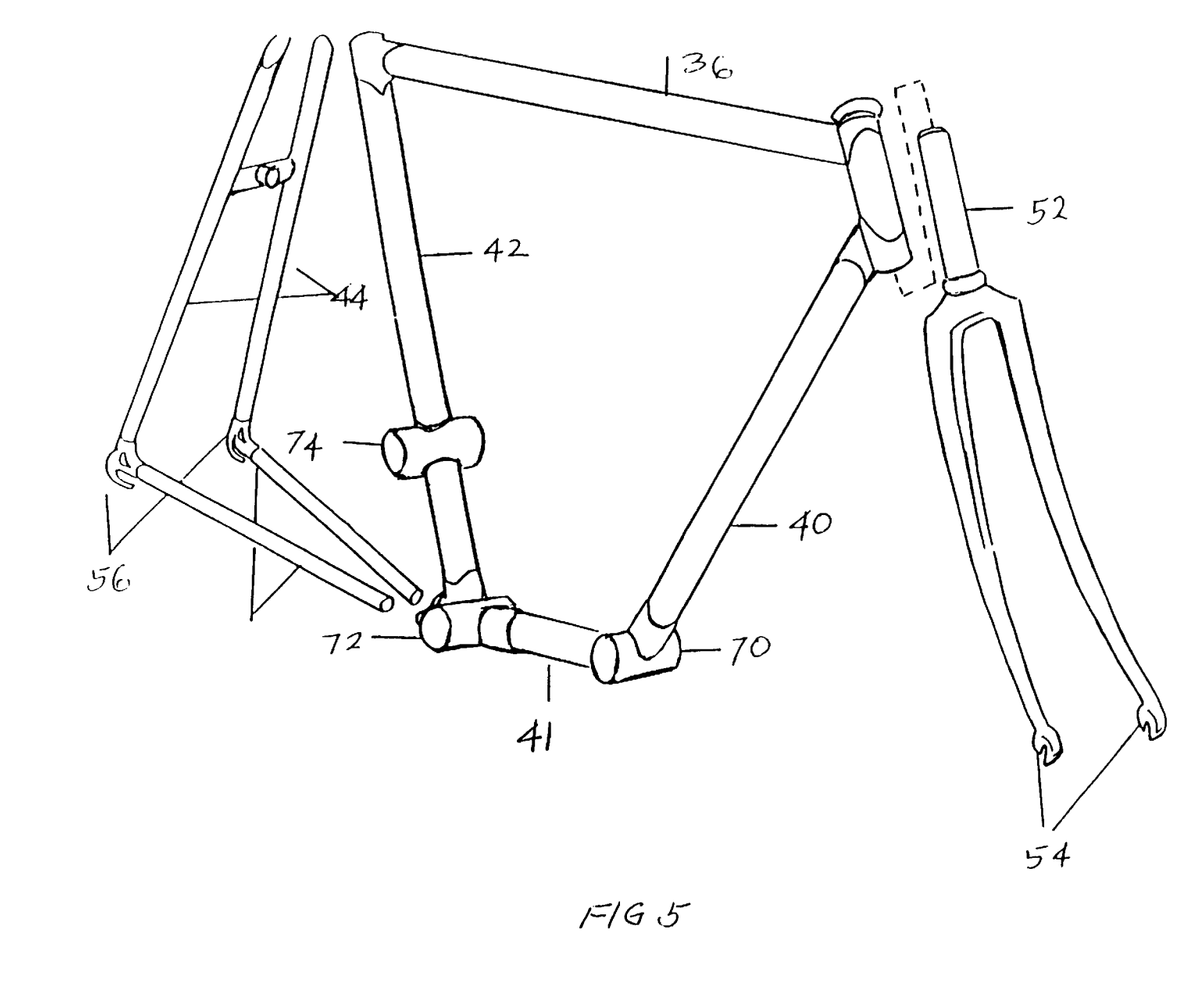
FIG. 5 is a perspective of a "Unique" bicycle frame showing three bottom bracket shells.
Figure 6:
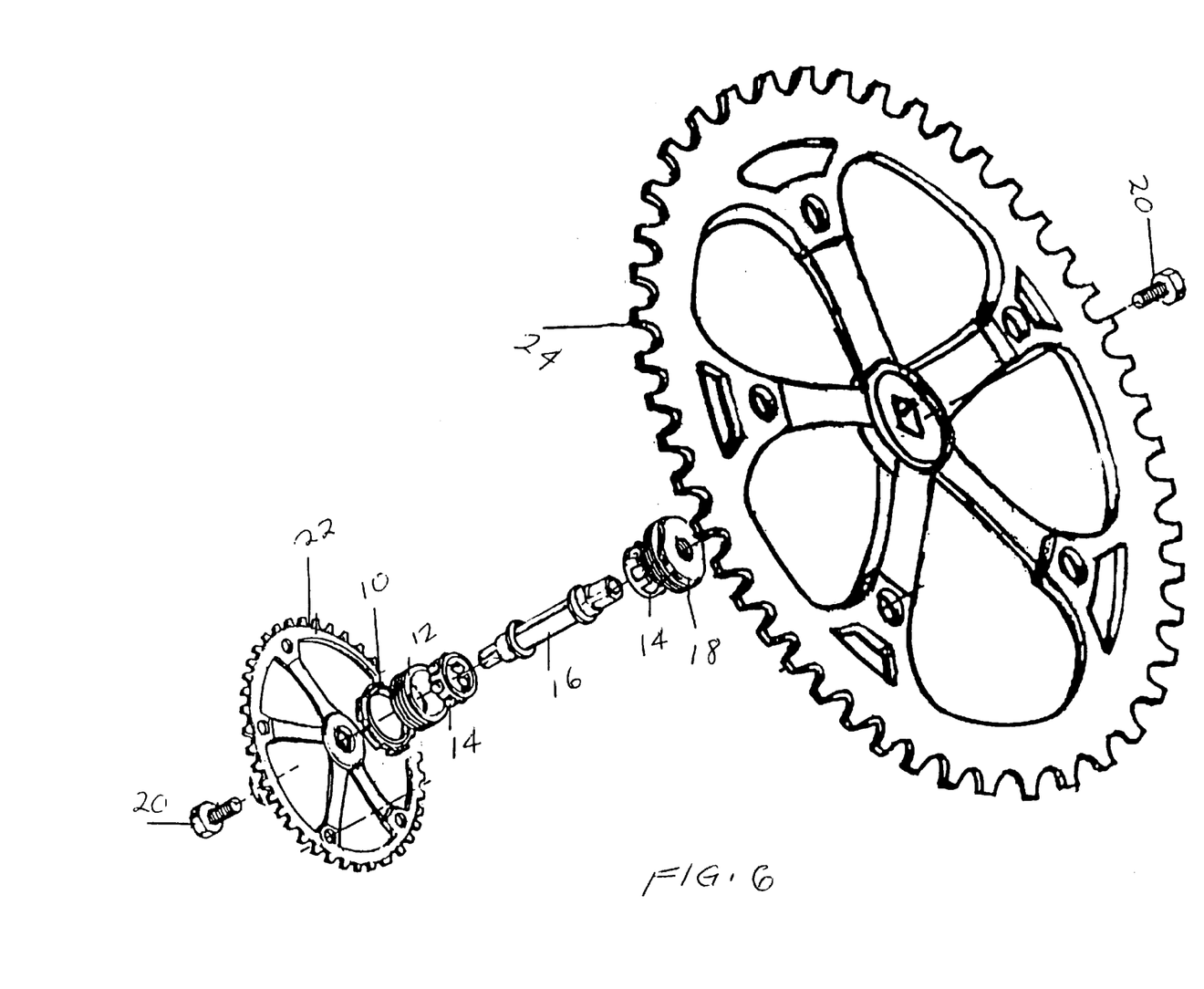
FIG. 6 is a perspective of a bottom bracket with a small gear and a large gear on each end of the spindle.
Figure 7:
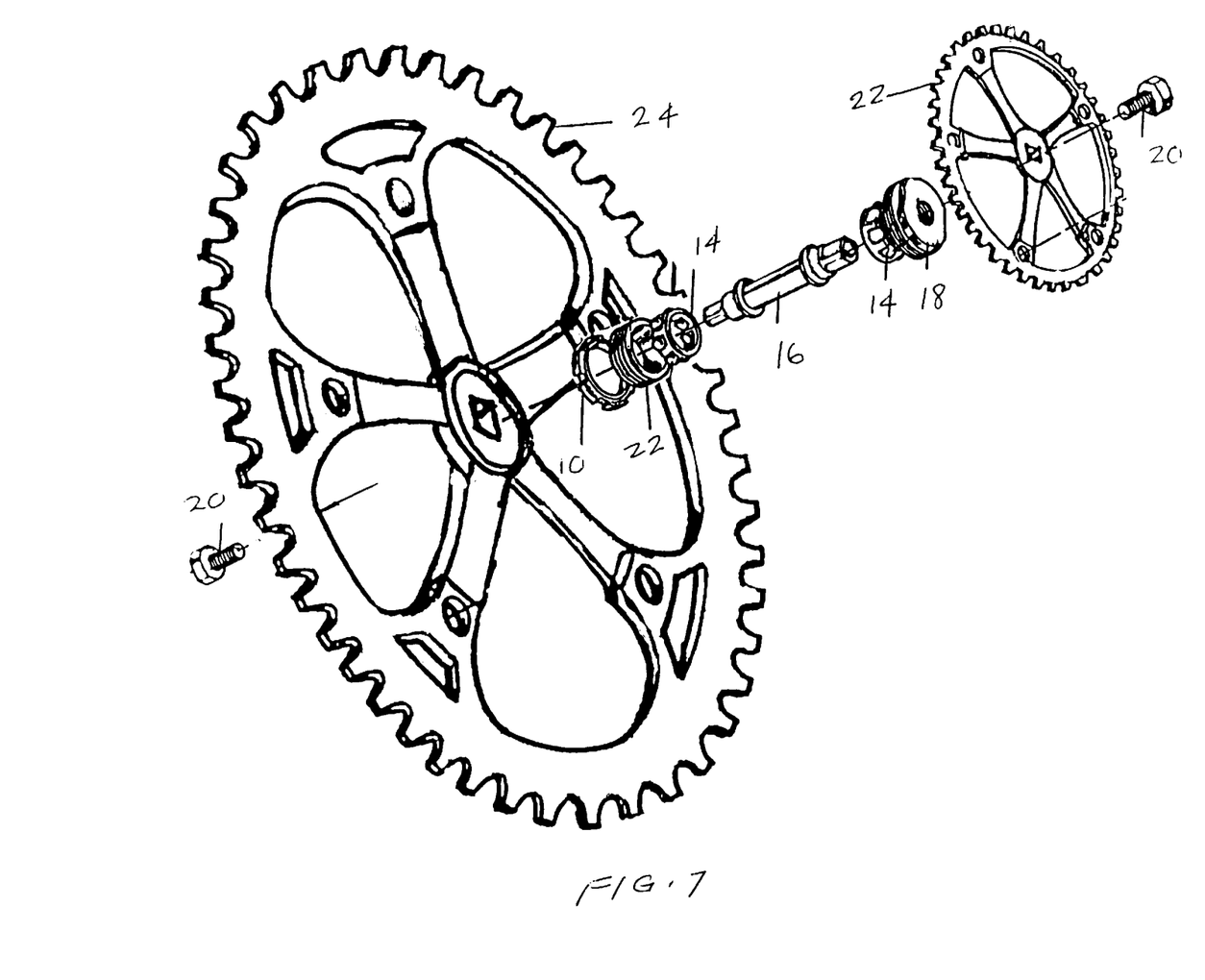
FIG. 7 is a perspective of a bottom bracket with a large gear and a small gear on each end of the spindle.

The "Unique" bicycle has a frame with three bottom bracket shells namely, the first bottom bracket shell (70) for the crankset (57) which is attached to the down tube (40). The second bottom bracket shell (72) is for the first converter (FIG. 6) which is attached to the bottom end of the seat tube (42). A down tube extension (41) extends between the bottom bracket shell (70) and the bottom bracket shell (72). The third bottom bracket shell (74) is for the second converter (FIG. 7) and is attached at the upper part of the seat tube (42).

Figure 8:
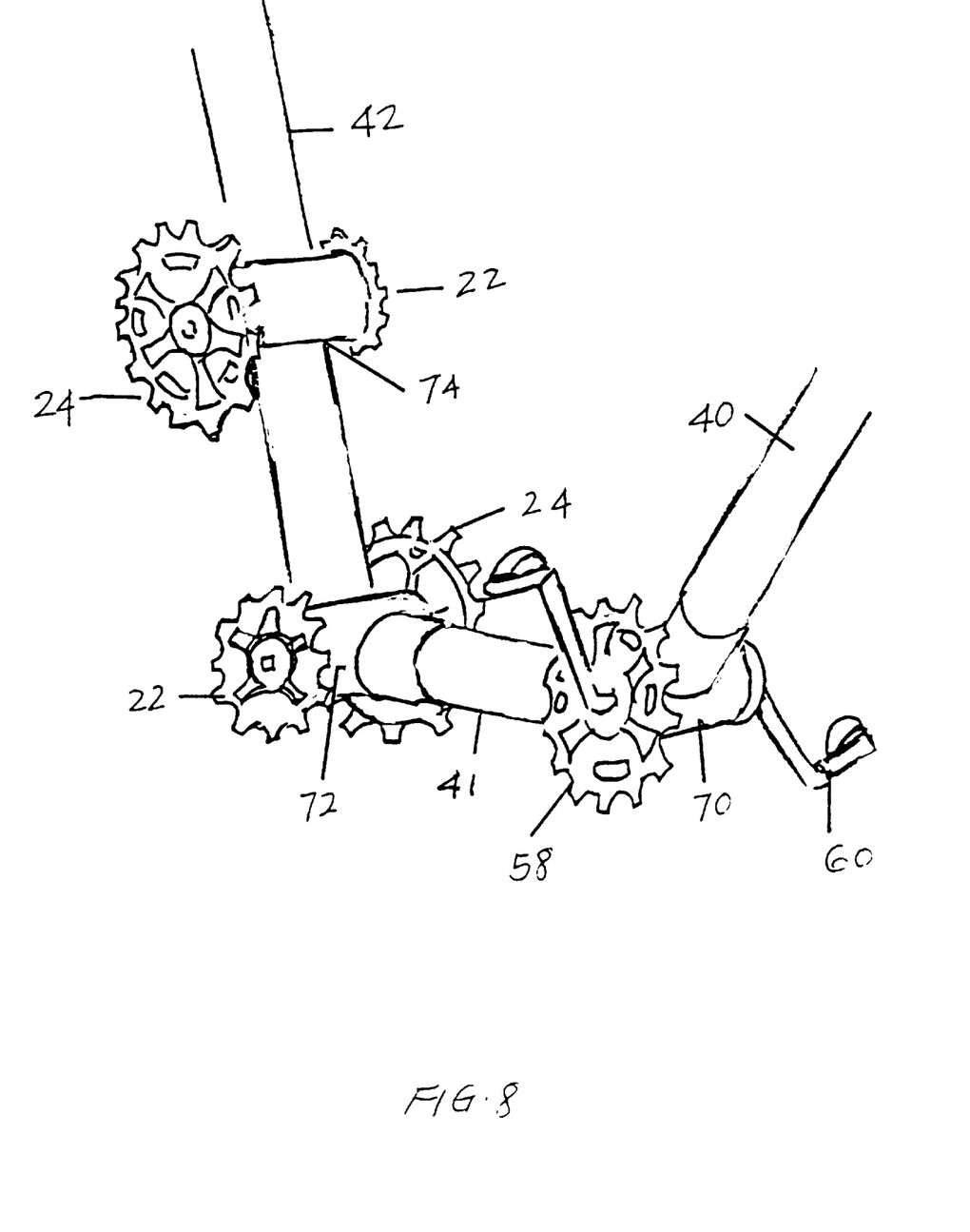
FIG. 8 is a detailed view of the three bottom brackets.
Figure 9:
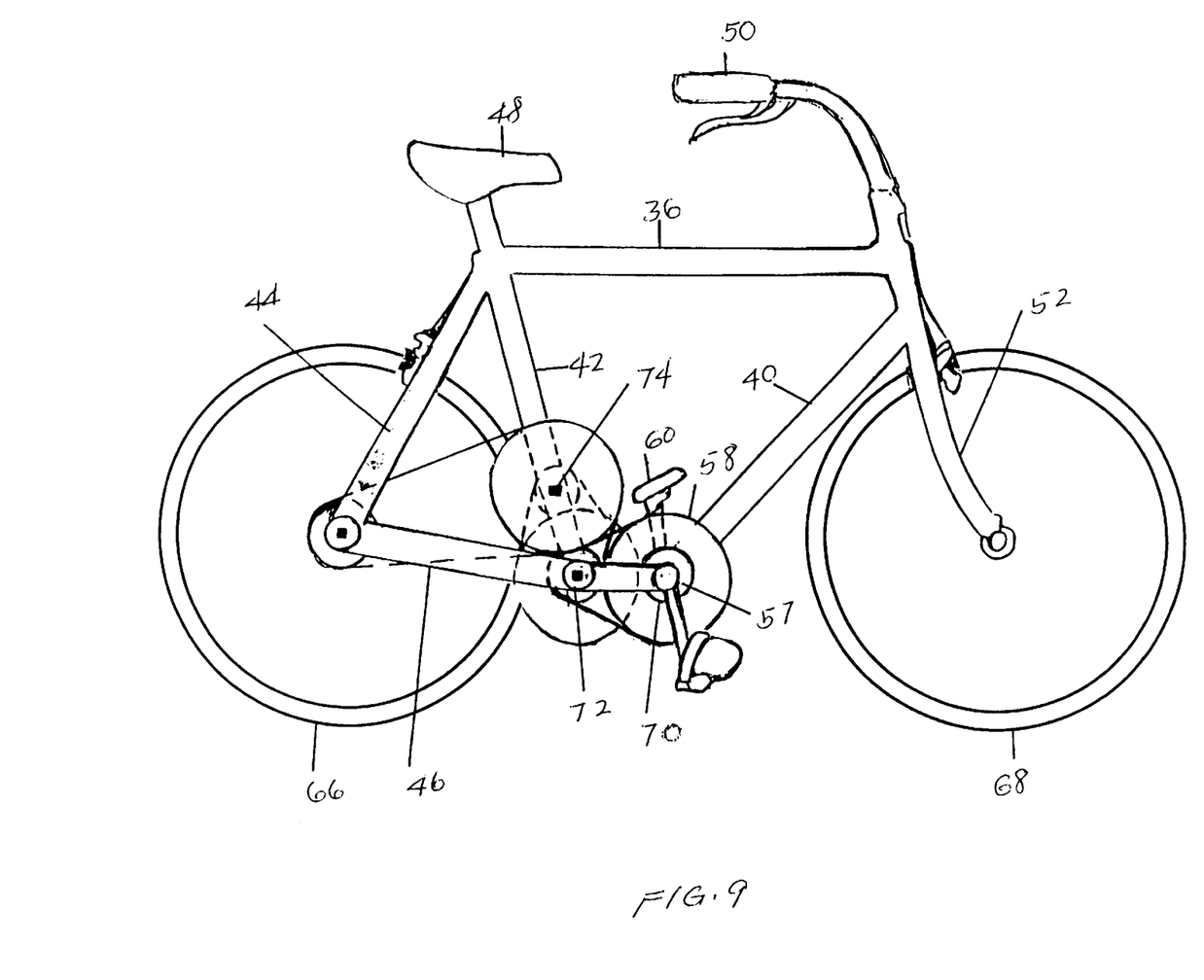
FIG. 9 is a side elevation of a "Unique" bicycle.

Three separate chains are used to interconnect all the gears. The first chain (62) connects the chainwheel (58) to the first converter's small gear (22) which is on the right hand side of the "Unique" bicycle while the second chain (62) connects its large gear (24) which is at the left hand side to the second converter's small gear (22) which is at the left hand side. The third chain (62) connects its large gear (24) which is at the right hand side to the rear wheel gear (64).

The "Unique" bicycle has a slightly longer overall length because the top tube (36) is longer to accomodate the down tube extension (41) in order to position the crankset farther away from the saddle (48). The purpose is to provide a more comfortable, erect, sitting position for the rider similar to a motorcycle.

OPERATION OF INVENTION

Operating the pedals at a narrow range of about 90 degrees or less, push the right pedal with the right foot to rotate the chainwheel (58). Chainwheel (58) in turn rotates the first small gear (22) and first large gear (24). First large gear (24) in turn rotates second small gear (22) and second large gear (24). Second large gear (24) in turn rotates rear wheel gear (64) causing the rear wheel (66) to roll forward. The left foot then pushes the left pedal backwards in order to bring back the right pedal to its original position. The procedure is repeated in operation thus rocking the pedals back and forth. Alternately, the left foot may push the pedal forward and the right foot may then push the right pedal backwards.

CONCLUSIONS, RAMIFICATIONS, AND SCOPE OF INVENTION

Thus the reader will see that the "Unique" bicycle is fast making it easier to pick up speed and makes it less tiring to maintain top speeds for prolonged periods of time. It provides a comfortable, erect, sitting position for the rider just like in a motorcycle.

While my above description contains many specificities, these should not be construed as limitations on the scope of the invention, but rather as an exemplification of one preferred embodiment thereof. Many other variations are possible. For example: 1. both the small gear and the large gear of both converters are together side by side at only one end of the spindle at the right hand side of the "Unique" bicycle, 2. each converter may have a small gear and a large gear at the right hand side spindle and a small and large gear at the left hand side of the spindle which means that there would be chains on the right hand side and the left hand side to connect the gears of the converters and that there are also two chainwheels, 3. Dicta device may be used in place of two separate small and large gear.

Accordingly, the scope of the invention should be determined not by the embodiments illustrated but by the appended claims and the legal equivalents.

I claim:

1. A bicycle having a frame having a down tube and a seat tube, wherein the improvement comprises:

the frame having three bottom bracket shells, including: a first bottom bracket shell located at a bottom of the down tube, said first bottom bracket shell houses a first bottom bracket attached with a chainwheel at the right hand side, and pedals at both ends of a first spindle; a second bottom bracket shell located at a jubction of a down tube extension and a bottom of the seat tube, said down tube extension extending between said first bottom bracket and said second bottom bracket, said second bottom bracket shell houses a second bottom bracket attached with a first small gear at the right hand side and a first large gear at the left hand side of a second spindle; and a third bottom bracket sheell located intermediate the seat tube, said third bottom bracket shell houses a third bottom bracket attached with a second large gear at the right hand side and a second small gear at the left hand side of a third spindle;

three separate chains to interconnect all said gears, including: a first chain which connects said chainwheel to said first small gear, a second chain which connects said first large gear to said second small gear, and a third chain to connect said second large gear to a rear wheel gear, the chainwheel gear being larger than the first small gear.

\* \* \* \* \*